B. J. O'QUINN.
ICE SEALING MEANS.
APPLICATION FILED JULY 13, 1911.
1,043,458.
Patented Nov. 5, 1912.
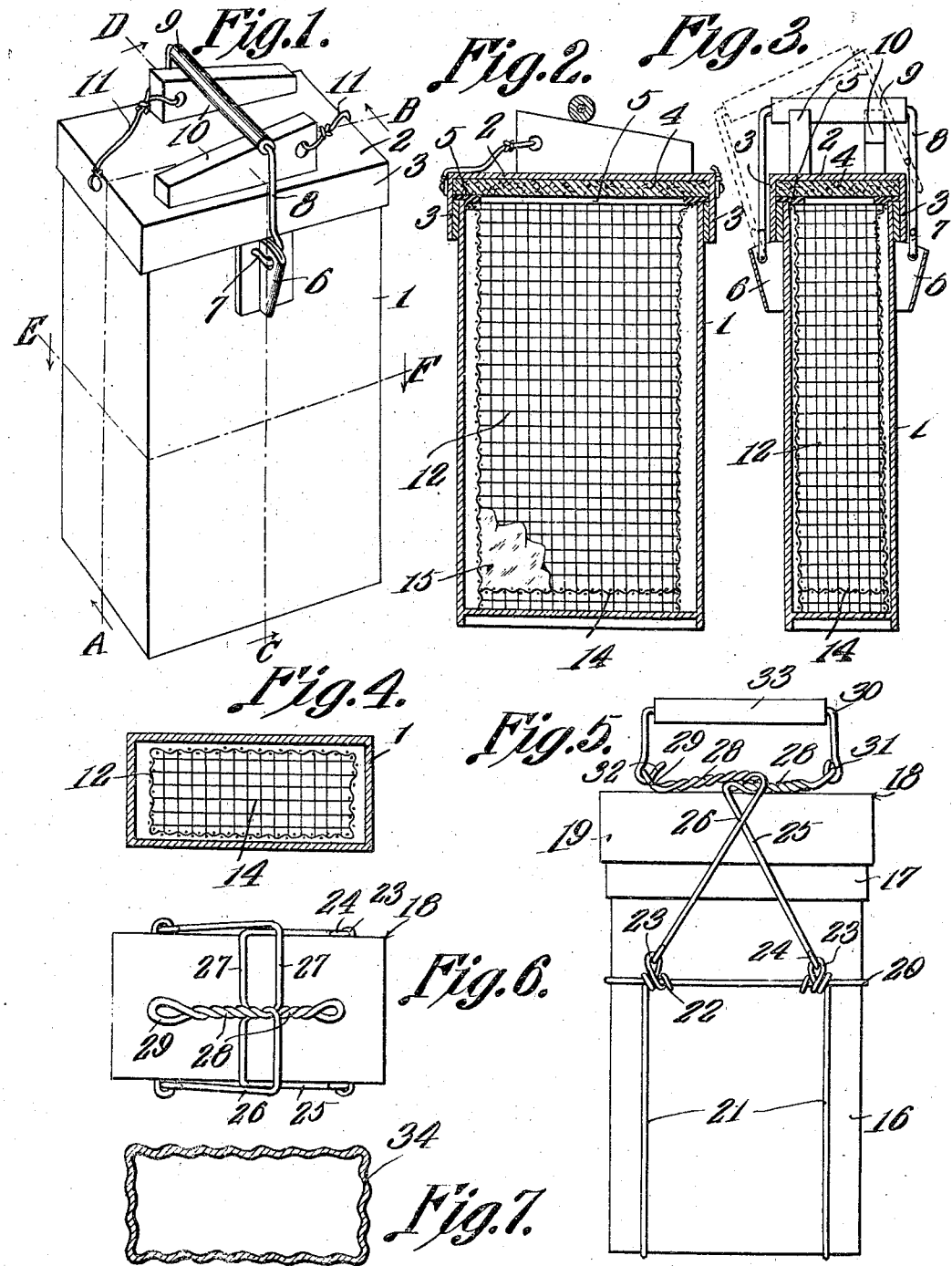
Witnesses
B. J. O'Quinn,
Inventor
by
Attorneys

UNITED STATES PATENT OFFICE.

BRYANT JEFFERSON O'QUINN, OF KISSIMMEE, FLORIDA.

ICE-SEALING MEANS.

1,043,458. Specification of Letters Patent. Patented Nov. 5, 1912.

Application filed July 13, 1911. Serial No. 638,361.

*To all whom it may concern:*

Be it known that I, BRYANT J. O'QUINN, a citizen of the United States, residing at Kissimmee, in the county of Osceola and State of Florida, have invented a new and useful Ice-Sealing Means, of which the following is a specification.

The object of the present invention is to provide a means whereby ice may be securely and hermetically sealed, the ice being dispensed in an original package, adapted to be placed, along with the ice, in the refrigerator, or other structure, the temperature of which it is desired to lower.

A further object of the invention is to provide a novel form of receptacle, in which ice may be kept.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows one form of the invention in perspective; Fig. 2 is a transverse section on the line A—B of Fig. 1; Fig. 3 is a transverse section on the line C—D of Fig. 1; Fig. 4 is a section on the line E—F of Fig. 1; Fig. 5 is a side elevation showing a modified form of the invention; Fig. 6 is a top plan of the device appearing in Fig. 5; and Fig. 7 is a transverse section showing a modified form of the invention.

In carrying out the invention, a refrigerating element, such as a piece of ice, is hermetically sealed in a receptacle fashioned from heat-conducting material, the construction being such that the device may be delivered in the receptacle, the receptacle and the ice being placed in the structure which it is desired to cool, without opening the receptacle, there being no drip from the receptacle, to contaminate and to moisten the structure in which the receptacle is placed. The receptacle may be of any form. In Fig. 1 it is denoted by the numeral 1, and is fashioned from heat-conducting material. The receptacle 1 is open at its top, and is closed by a lid 2, of any desired construction, the same preferably having a depending flange 3, adapted to embrace the upper end of the receptacle 1. The lid 2 may be reinforced in its interior, as shown at 4, so as to exert an even pressure upon the upper edge of the receptacle 1, the lid 2 being internally provided with a gasket 5, fashioned from rubber or the like, the gasket 5 being adapted to bear directly upon the upper edge of the receptacle 1. A means is provided for clamping the lid 2 upon the receptacle 1, and this means may be of any form. If desired, ears 6 may be attached to the opposite sides of the receptacle 1, the ears 6 being adapted to engage, removably, hooks 7, formed upon the ends of a bail 8. Journaled for rotation upon the intermediate portion of the bail 8, is a roller 9, serving as the handle portion of the bail. The bail 8 is of but little height (for a purpose to be described hereinafter) the construction being such that the bail 8 cannot be swung over the edges of the lid 2. In order to permit a removal of the lid 2, one of the hooks 7 may be disengaged from one of the ears 6, the bail 8 being swung to one side.

The invention may further include a pair of wedges 10, adapted to be inserted in opposite directions, beneath the roller 9, to bear upon the lid 2, the wedges 10 being connected with the lid 2 by means of flexible elements 11, united with the lid 2 at spaced points, and preferably adjacent opposite edges of the lid. Obviously, the roller 9 acts as an anti-friction element, permitting a ready insertion of the wedges 10, and if the wedges 10 are spaced apart sufficiently, the hand of the operator may engage with the member 9, between the wedges 10, for the purpose of carrying the receptacle 1 about.

A means is provided for preventing the ice from coming into direct contact with the interior of the receptacle 1. This means may take the form of a mesh work wire basket 12, adapted to fit within the receptacle. The bottom 14 of the basket 12 is spaced apart from the bottom of the receptacle 1, to accommodate the drip of the ice, a portion of a piece of ice being shown within the receptacle 1, see Fig. 2, and there denoted by the numeral 15.

If desired, the device may be modified to the extent indicated in Figs. 5 and 6. Under such circumstances, the receptacle 16 is provided about its upper edge with a reinforcing rim 17, over which fits the flange 19 of the lid 18.

Any desired means may be provided for securing the locking bails to the receptacle 16. In the present instance, the receptacle 16 is surrounded intermediate its ends by a ring 20, and reinforcing strips 21 extend, at right angles to the ring 20, along the sides of the receptacle, and across the bottom thereof. The ends of the strips 21 are coiled, as shown at 22, about the ring 20, and in these coiled portions 22 are formed upstanding eyes 23, adapted to receive, removably, the hooks 24, formed at the lower ends of bails 25, crossed upon each other, upon the sides of the receptacle, as shown at 26. The intermediate portions 27 of the bails 25 extend across the top of the lid 18 in spaced relation. The intermediate portions 27 of the bails are twisted to form outstanding, rectangularly disposed arms 28, the arm 28 of one bail extending across the intermediate portion 27 of the other bail. The arms 28 may be twisted upon themselves, or otherwise formed, so as to fashion eyes 29 in the extremities of the arms. These eyes 29 are upwardly inclined, away from the lid 18, as shown in Fig. 5.

The invention further includes a bail 30, fashioned at one end with an eye 31, adapted to afford a pivotal union between the bail 30 and one of the eyes 29. The bail 30 is a resilient structure, and is formed at one end with a hook 32, adapted to be engaged removably in the other eye 29. Mounted upon the intermediate portion of the bail 30 is a handle 33. It will be seen that when the bail 30 is engaged with the eyes 29, the intermediate portions 27 of the bails 25 will be pressed downwardly upon the lid 18, thereby binding the same firmly upon the upper edge of the receptacle 16, it being understood that the lid 18 is suitably reinforced and packed, so as to effect an hermetic closure of the upper, open end of the receptacle 16.

The receptacle, of course, may be of any desired form and outline, and, if desired, it may be corrugated, as shown at 34 in Fig. 7.

In practical operation, the ice 15 is placed in the receptacle, and the lid is securely clamped thereon, hermetically sealing the ice within the receptacle, it being noted that there are no openings in the receptacle. Thus, the ice will be protected against air currents and, at the same time, there will be no drip from the receptacle, due to the melting of the ice. The construction is such that the receptacle and the contained ice may be placed within a vat of wine or other substance, without diluting the same, from the drip of the melting ice.

Having thus described the invention, what is claimed is:

1. In a device of the class described, a receptacle; a lid therefor; crossed bails pivotally supported at the sides of the receptacle and having their intermediate portions extended across the lid, the intermediate portions of the bails being provided with oppositely extended arms, the arms terminating in eyes, inclined with respect to the plane of the lid; an arched handle pivoted in the eye of one arm, and provided with a hook adapted to engage the eye of the other arm, the handle being resilient, to draw the arms toward each other, and to force the intermediate portions of the bails down upon the lid.

2. In a device of the class described, a receptacle; a lid therefor; crossed bails pivotally supported at the sides of the receptacle for individual swinging movement and having their intermediate portions extended across the lid upon opposite sides of the point of crossing of the bails, the intermediate portion of one bail bearing upon the lid; and a handle connecting the intermediate portions of the bails, the handle constituting the sole connection between the bails.

3. In a device of the class described, a receptacle; a lid therefor; bails pivotally supported at the sides of the receptacle and crossed upon the sides of the receptacle below the lid, the bails having their intermediate portions extended across the lid, said portions having alined, oppositely extended arms; an arched handle pivotally connected with one arm, and adapted for removable engagement with the other arm, the handle being resilient, to draw the intermediate portions of the bails toward each other, and to force the intermediate portions of the bails upon the lid.

4. In a device of the class described, a receptacle; a lid therefor; bails pivotally supported at the sides of the receptacle and crossed upon the sides of the receptacle below the lid, the bails having their intermediate portions extended across the lid upon opposite sides of the crossing point of the bails; and an arched handle connecting one bail detachably with the other bail.

5. In a device of the class described, a receptacle; a lid therefor; a ring surrounding the receptacle; reinforcing strips extended at an angle to the ring, along the sides of the receptacle and across the bottom thereof, the ends of the strips being coiled about the ring, there being eyes formed in the coiled portions of the strips; crossed bails pivoted in the eyes and having their intermediate portions extended across the lid, the intermediate portions of the bails being twisted, to form oppositely extended arms, the arms being terminally provided with eyes, disposed at an angle to the plane of the lid; and an arched handle pivotally connected with the eye of one arm, and provided with an inwardly projecting hook, adapted to engage with the eye of the other arm.

In testimony that I claim the foregoing as my own, I have hereto affixed my signature in the presence of two witnesses.

BRYANT JEFFERSON O'QUINN.

Witnesses:
W. J. NELSON,
R. O. MEEK.

Copies of this patent may be obtained for five cents each, by addressing the "Commissioner of Patents, Washington, D. C."